United States Patent [19]

Dietrich

[11] Patent Number: 4,556,300
[45] Date of Patent: Dec. 3, 1985

[54] PAD ASSEMBLY FOR EYEGLASS FRAMES

[75] Inventor: Anton Dietrich, Munich, Fed. Rep. of Germany

[73] Assignee: Optische Werke G. Rodenstock, Munich, Fed. Rep. of Germany

[21] Appl. No.: 463,726

[22] Filed: Feb. 4, 1983

[30] Foreign Application Priority Data

Feb. 18, 1982 [DE] Fed. Rep. of Germany ....... 3205900

[51] Int. Cl.$^4$ ................................................ G02C 5/12
[52] U.S. Cl. ..................................... 351/137; 351/136; 351/138
[58] Field of Search .................. 351/137, 132, 80, 88, 351/136, 138

[56] References Cited

U.S. PATENT DOCUMENTS

| 2,080,853 | 5/1937 | Nelson | 351/138 |
| 4,205,905 | 6/1980 | Abel et al. | 351/138 |
| 4,420,227 | 12/1983 | Speer | 351/138 |

FOREIGN PATENT DOCUMENTS 1401735 4/1965 France ................................ 351/137

Primary Examiner—Rodney B. Bovernick
Attorney, Agent, or Firm—Craig & Burns

[57] ABSTRACT

A pad assembly for eyeglass frames, in which an insert with a mounting portion is molded-in into the nose pad, whereby the mounting opening of the mounting portion is located outside of the nose pad; a connecting area is provided at the pad arm end which includes one or several projections and is adapted to be inserted into the mounting opening. The mounting opening is dimensionally reduced by plastic deformation of the mounting portion to such an extent that with an inserted connecting area of the pad arm end, a form-locking connection will result between the mounting portion and the pad arm.

12 Claims, 7 Drawing Figures

U.S. Patent   Dec. 3, 1985   Sheet 1 of 2   4,556,300
FIG. 1
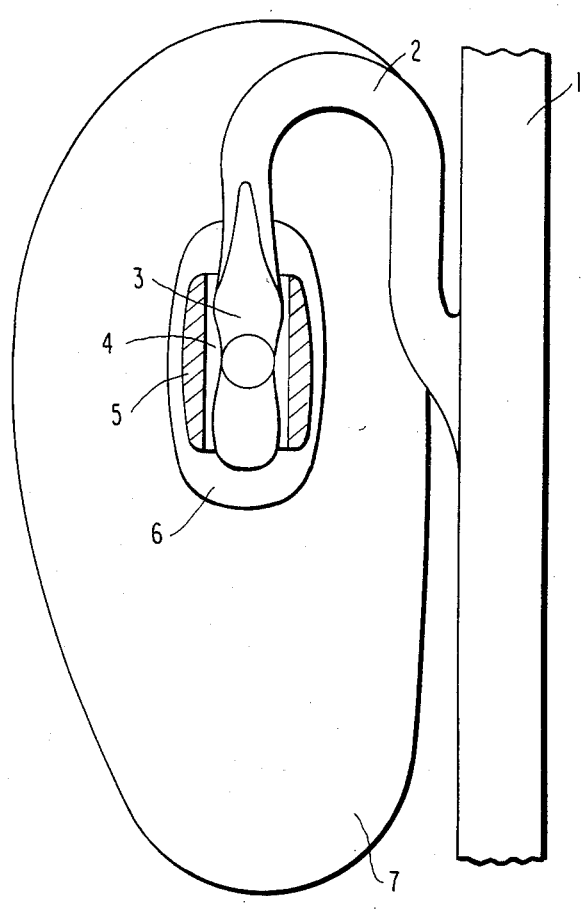
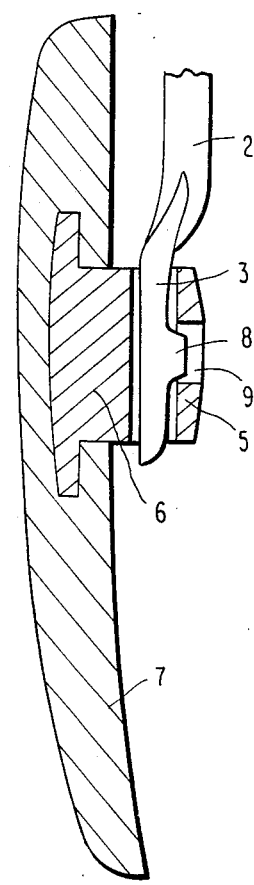
FIG. 2
FIG. 3
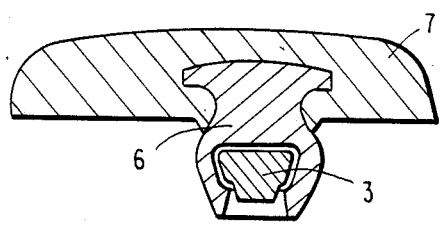

PAD ASSEMBLY FOR EYEGLASS FRAMES

The present invention relates to a pad assembly for eyeglass frames consisting of a nose pad with a molded-in insert member and of a pad arm which is connected at its one end with the eyeglass frame and at the other end of which is provided a connecting area, to which is coordinated a mounting portion on the insert member, whereby the connecting area is adapted to be inserted into the mounting opening of the mounting portion and includes one or several projections, respectively, cross-sectional enlargements transverse to the insertion direction.

It is known in the prior art to connect the nose pad and the pad arm by screws. With these costly screw-type constructions, problems arise during the assembly and disassembly, conditioned on the smallness of the parts.

Furthermore, it is known to establish a pad assembly connection by way of an elastic deformation of individual parts.

Thus, for example, in the German Gebrauchsmuster No. 78 23 934, a connection is described, in which the nose pad consists of a spring-elastic hard plastic material and includes an extension which is constructed U-shaped and is disposed with its open side opposite the nose pad, whereby mutually oppositely directed detent projections are provided at its leg ends which elastically engage from behind, in a known manner, a frame arranged at the pad arm after the insertion of the extension into the frame.

The German Patent No. 27 12 897 describes a pad assembly connection, in which the elastic elements are provided at the pad arm in such a manner that the pad arm end is constructed fork-shaped and outwardly directed projections are arranged at the ends of the fork legs which, after the insertion of the fork into a mounting part coordinated thereto at the nose pad, elastically engage from behind the mounting part when the fork ends leave the mounting opening.

It has been found in practice that with the very small dimensions of the elastic connecting elements, a permanently holding connection cannot be attained by such constructions, whereby it is immaterial by reason of the slight engaging depths of the parts whether the elastic elements are made of plastic material or of any other customary material.

The present invention is concerned with the task to provide a pad assembly connection for eyeglass frames, in which the assembly is possible by means of customary flat nose pliers and whereby a permanent connection is achieved which is far-reachingly independent of wear.

The underlying problems are solved according to the present invention in that the mounting opening is so dimensioned that the connecting area of the pad arm is adapted to be inserted in the longitudinal direction thereof, and in that with an inserted connecting area, the mounting opening is reduced dimensionally to such an extent by plastic deformation of the mounting portion that a form-locking connection of the mounting portion with the pad arm is formed. The term "plastic deformation" is used herein in its normal meaning to describe the ability to change the shape of a part, plastically deformed, into a new shape which the part will then retain permanently as long as no further plastic deformation occurs.

According to an advantageous further development of the present invention, the mounting portion includes curved or arched areas in such a manner that with a deforming pressure, for example, by means of pliers on these areas, i.e., transversely to the engaging direction of the form-locking connection, the form-locking connection is rendered inoperable, i.e., released. A destruction-free disassembly of the pad assembly connections is made possible thereby.

In the construction according to the present invention of a pad assembly connection, a form-locking connection will result that, however, is still movable, whereby a rigid connection is attainable by a further plastic deformation of the mounting portion.

These and further objects, features and advantages of the present invention will become more apparent from the following description when taken in connection with the accompanying drawing which shows, for purposes of illustration only, several embodiments in accordance with the present invention, and wherein:

FIG. 1 is a front elevational view of a pad assembly connection in accordance with the present invention;

FIG. 2 is a side view of the pad assembly connection of FIG. 1, whereby the nose pad with the insert is shown in longitudinal cross section;

FIG. 3 is a plan view on FIG. 1, again showing the nose pad and the pad arm connecting area in cross section;

Figure 4:
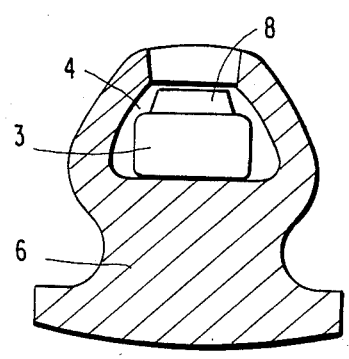
FIG. 4 is a cross-sectional view through a nose pad insert member with the mounting opening and the inserted pad arm in the preassembled condition in a pad assembly connection according to the present invention.

Referring now to the drawing wherein like reference numerals are used throughout the various views to designate like parts, and more particularly to FIG. 1, this figure illustrates a frame rim 1 with the pad arm 2 and the pad arm connecting area 3, whereby the connecting area 3 is inserted into the mounting opening 4 of the mounting portion 5. The mounting portion 5 is a part of the insert 6 which is molded into the nose pad 7.

FIG. 2 illustrates a side view according to FIG. 1, whereby the nose pad 7 together with the insert 6 is illustrated in cross section in the longitudinal direction thereof. The connecting area 3 of the pad arm 2 includes a warp-shaped projection 8 which engages in an opening 9 coordinated thereto and provided in the mounting portion 5.

FIG. 3 illustrates the plan view of FIG. 1, whereby the nose pad 7 and the pad arm connecting area 3 are illustrated in cross section.

FIG. 4 illustrates the insert 6 in cross section, as well as the pad arm connecting area 3—inserted into the mounting opening 4—together with its projection 8 in the preassembled condition.

Figure 5:
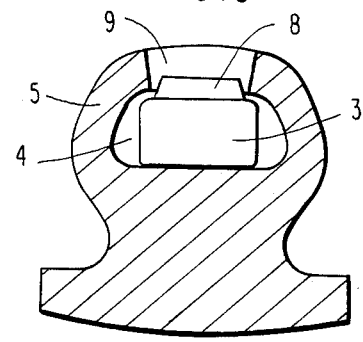
FIG. 5 is a view similar to FIG. 4, showing the various parts in the assembled but movable condition.

FIG. 5 illustrates a view, similar to FIG. 4, whereby the mounting opening 4 has been dimensionally reduced by plastic deformation of the mounting portion 5 to such an extent that a form-locking, yet still movable connection is formed between the mounting portion 5 and the pad arm connecting area 3. The projection 8 thereby engages into the opening 9 coordinated thereto.

Figure 6:
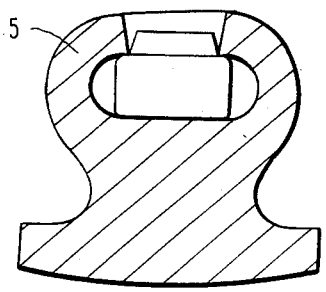
FIG. 6 is a view similar to FIGS. 4 and 5, showing the various parts in the assembled and play-free condition.

FIG. 6 illustrates a view similar to FIG. 5, whereby a form-locking and rigid connection is formed by a further plastic deformation of the mounting portion 5.

Figure 7:
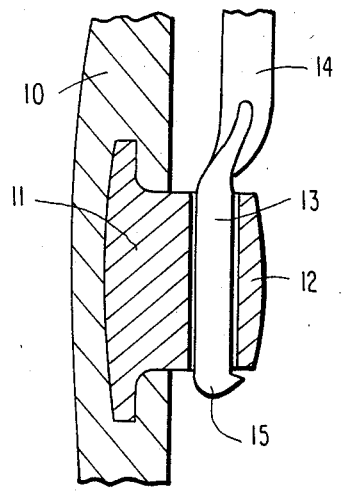
FIG. 7 is a partial cross-sectional view through a modified embodiment of a pad assembly connection in accordance with the present invention.

FIG. 7 illustrates a side view of a pad assembly connection according to a modified embodiment of the present invention. The nose pad 10 together with the insert 11 is illustrated in cross section. The connecting area 13 of the pad arm 14 which is provided at its end with an enlarged portion 15, is inserted into the mounting portion 12, whereby a form-locking connection is formed by plastic deformation of the mounting portion 12.

The connecting area 5, 12 of the insert 6, 11 is thereby made of any suitable known plastically deformable material having the desired characteristic, such as suitable plastically deformable alloy materials, for example, German silver (according to ISO norms: CuNi 18 Zn 20), bronze (according to ISO norms: SnBz 6), and Monel (according to ISO norms: NiCu 30 Fe). Additionally, a plastic material deformable by heating such as a fiber-reinforced polyamide would also be suitable for the present invention.

While I have shown and described two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A pad assembly for eyeglass frames, comprising a nose pad means with a molded-in insert means having a mounting portion provided with a mounting opening, a pad arm which at its one end is connected with an eyeglass frame and at its other end includes a connecting area, to which is coordinated the mounting portion, the connecting area being operable to be inserted into the mounting opening and being provided with at least one enlargement extending transversely to the insertion direction, the mounting opening being so dimensioned that the connecting area of the pad arm is adapted to be inserted in the longitudinal direction thereof, and that with the connecting area inserted into said mounting opening, the mounting opening is reduced by plastic deformation of the mounting portion in a direction substantially transverse to the insertion direction to such an extent that the mounting opening permanently reduced by said plastic deformation produces a form-locking connection of the mounting portion with the pad arm.

2. A pad assembly according to claim 1, characterized in that the mounting portion is so dimensioned that the form-locking connection can be effectively disengaged by a deforming pressure transversely to the engaging direction of the form-locking connection.

3. A pad assembly according to claim 1, characterized in that the form-locking connection is movable.

4. A pad assembly according to claim 2, characterized in that the form-locking connection is movable.

5. A pad assembly according to claim 1, characterized in that the connecting area of the pad arm is provided approximately in its center with a warp-shaped projection which forms a form-locking connection with an aperture coordinated thereto in the mounting portion.

6. A pad assembly according to claim 2, characterized in that the connecting area of the pad arm is provided approximately in its center with a warp-shaped projection which forms a form-locking connection with an aperture coordinated thereto in the mounting portion.

7. A pad assembly according to claim 1, characterized in that the connecting area of the pad arm is provided at its end with a thickened portion which forms a form-locking connection with the mounting portion.

8. A pad assembly according to claim 2, characterized in that the connecting area of the pad arm is provided at its end with a thickened portion which forms a form-locking connection with the mounting portion.

9. A pad assembly according to claim 1, characterized in that the connecting area is provided with several projections extending substantially transversely to the insertion direction.

10. A pad assembly according to claim 8, characterized in that the connecting area is provided with several projections extending substantially transversely to the insertion direction.

11. A pad assembly according to claim 1, characterized in that the connecting area is provided with several cross-sectionally thickened portions extending transversely to the insertion direction.

12. A pad assembly according to claim 8, characterized in that the connecting area is provided with several cross-sectionally thickened portions extending transversely to the insertion direction.

* * * * *